3,130,218
PROCESS FOR THE PREPARATION OF
4-NITROSTILBENE CARBONITRILES
Anthony J. Cofrancesco, Albany, N.Y., assignor to General Aniline & Film Corporation, New York, N.Y., a corporation of Delaware
No Drawing. Filed Oct. 10, 1961, Ser. No. 144,031
5 Claims. (Cl. 260—465)

The present invention relates to an improved process for the preparation of 4-nitrostilbenes, and more particularly to the preparation of 4-nitrostilbenes by the condensation of 5-nitro-o-tolunitrile with an aromatic aldehyde in the presence of a catalytic amount of hexamethyleneimine as a catalyst for the reaction.

Heretofore, 4-nitrostilbenes have been prepared by condensing aromatic aldehydes with a number of nitrobenzenes including 2-methyl-5-nitrobenzenesulfonic acids and the like in the presence of catalysts such as saturated secondary amines including diethylamine, dibutylamine, dicyclohexylamine, pyrrolidine, morpholine, piperidine, 2-methylpiperidine and the like. It has also been proposed to prepare 4-nitrostilbenes by reacting 4-nitrotoluenes and benzaldehyde in the presence of sodium hydroxide and sodium methoxide. However, the application of the aforementioned catalysts in the condensation of 5-nitro-o-tolunitrile with aromatic aldehydes results in poor yields of products which makes such processes economically unattractive for the manufacture of such products. Additionally, the degree of purity of the products is impaired to such a degree that they are unsatisfactory for use as intermediates in the manufacture of fluorescent brightening agents. This is probably due to the fact that the high alkalinity of the above catalysts causes partial hydrolysis of the nitrile group, thus lowering the degree of purity of the product.

Thus, it is an object of this invention to provide an economically attractive process for the reaction of 5-nitro-o-tolunitrile with aromatic aldehydes for the production of products in high yields and of a high degree of purity such that they are suitable for use in the manufacture of fluorescent brighening agents. Another object of this invention is to provide a catalyst for the reaction of 5-nitro-o-tolunitrile with aromatic aldehydes which does not substantially effect the purity of the reaction product.

The attainment of the above objects is now made possible by the process of this invention which comprises reacting an aromatic aldehyde and 5-nitro-o-tolunitrile in the presence of a catalytic amount of hexamethyleneimine.

The nature and character of the aromatic aldehyde suitable for use in accordance with this invention is not necessarily critical. Any aromatic aldehyde whether containing one or more substituents in the aryl nucleus is operative for the purposes of the invention and include benzaldehyde; o-chlorobenzaldehyde; m-chlorobenzaldehyde; p-chlorobenzaldehyde; 2,4-dichlorobenzaldehyde; 2,5-dichlorobenzaldehyde; 2,6-dichlorobenzaldehyde; o-bromobenzaldehyde; m-bromobenzaldehyde; p-bromobenzaldehyde; o-tolualdehyde; m-tolualdehyde; p-tolualdehyde; o-nitrobenzaldehyde; m-nitrobenzaldehyde; p-nitrobenzaldehyde; 2,4-dinitrobenzaldehyde; o-methoxybenzaldehyde; p-methoxybenzaldehyde; naphthaldehyde; terephthaldehyde, cuminaldehyde; and the like.

While stoichiometric or equimolar proportions of the two reactants are required as illustrated by the following representative equation:

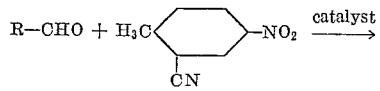

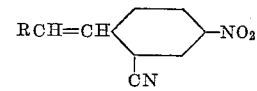

and the use of these proportions of reactants is preferred, an excess of either reactant can also be employed.

The reaction between the aromatic aldehyde and 5-nitro-o-tolunitrile proceeds smoothly at temperatures in the range of from 50° C.–150° C. It is preferred, however, to carry out the reaction at a temperature of from 100° C. through 140° C. over a period of from 3 through 10 hours since obviously, economies of time can be realized at the preferred elevated temperatures.

The hexamethyleneimine catalyst can be employed in amounts varying from about 0.035 mol to 0.1 mol of catalyst per mol of 5-nitro-o-tolunitrile and is preferably gradually added to the reaction mixture over a period of time although it could be added all at once as desired.

In carrying out the reaction, the reactants and catalyst can be dissolved in a suitable solvent if desired, although it is generally not necessary. Suitable solvents which find utility in the process of the instant invention include polyalkylene glycols, including polyethylene glycols and polypropylene glycol, having molecular weights in the range of from about 190 and about 7500. Other suitable solvents include alkoxy end-blocked monoethers of glycols and alkylene glycols, dioxane, aliphatic, cycloaliphatic and aromatic alcohols, tertiary amines, alkanolamines, aliphatic and aromatic hydrocarbon solvents such as benzene, ethylene dichloride and the like.

If it is desired to employ a solvent in carrying out the process of the invention, the amount of solvent is not necessarily critical. Amounts of solvent up to about 10 times that of either reactant can be employed with facility.

The following examples will serve to illustrate the practice of the process of the invention.

EXAMPLE I

Preparation of 4'-Chloro-4-Nitro-2-Stilbenecarbonitrile

A mixture of 81 grams of 5-nitro-o-tolunitrile (0.5 mol), 77.4 grams of p-chlorobenzaldehyde (0.5 mol) and 5 cc. of hexamethyleneimine was heated for a period of 2 hours with agitation to a temperature in the range of 123° C.–125° C. After an additional hour, 2.5 cc. of hexamethyleneimine was added. After another hour, 2.5 cc. of hexamethyleneimine was added to the reaction mixture and heating continued at the above temperature for another hour whereupon the temperature of the reaction mixture was reduced to 105° C. and 150 cc. of glacial acetic acid was added to the reaction mixture. The mass was then cooled slowly with agitation, filtered and the filter cake washed with 100 cc. of glacial acetic acid. The filter cake was resludged in 900 cc. of water at a temperature of 50° C. and caustic was added to phenolphthalein alkalinity and the product was filtered after digesting at 50° C. for a period of 1 hour. The filter cake was washed neutral and dried and there was obtained 119 grams of 4'-chloro-4-nitro-2-stilbenecarbonitrile having a melting point of 190° C.–197° C. and having a purity, by spectro determination of 97 percent. The yield of product was 84 percent of the theoretical.

EXAMPLE II

*Preparation of 4'-Chloro-4-Nitro-2-Stilbenecarbonitrile*

A mixture of 81 grams of 5-nitro-o-tolunitrile (0.5 mol), 77.4 grams of p-chlorobenzaldehyde (0.55 mol) and 5 cc. of piperidine was heated for a period of 2 hours with agitation to a temperature in the range of 123° C.–125° C. After an additional hour, 2.5 cc. of piperidine was added. After another hour, another 2.5 cc. of piperidine was added to the reaction mixture and heating continued at the above temperature for another hour whereupon the temperature of the reaction mixture was reduced to 105° C. and 150 cc. of glacial acetic was added to the reaction mixture. The mass was then cooled slowly with agitation, filtered and the filter cake washed with 100 cc. of glacial acetic acid. The filter cake was resludged in 900 cc. of water at a temperature of 50° C. and caustic was added to phenolphthalein alkalinity and the product was filtered after digesting at 50° C. for a period of 1 hour. The filter cake was washed neutral and dried and there was obtained 90 grams of 4'-chloro-4-nitro-2-stilbenecarbonitrile having a melting point of 184° C.–196° C. and having a purity, by spectro determination, of 93 percent. The yield of product was 61 percent of the theoretical.

EXAMPLE III

*The Preparation of 4-Nitro-2-Stilbenecarbonitrile*

A mixture of 81 grams of 5-nitro-o-tolunitrile (0.5 mol), 58.3 grams of benzaldehyde (0.55 mol) and 5 cc. of hexamethyleneimine was heated for a period of 2 hours with agitation to a temperature in the range of 123° C.–125° C. After an additional hour, 2.5 cc. of hexamethyleneimine was added. After another hour, another 2.5 cc. of hexamethyleneimine was added to the reaction mixture and heating continued at the above temperature for another hour whereupon the temperature of the reaction mixture was reduced to 105° C. and 150 cc. of glacial acetic acid was added to the reaction mixture. The mass was then cooled slowly with agitation, filtered and the filter cake washed with 100 cc. of glacial acetic acid. The filter cake was resludged in 900 cc. of water at a temperature of 50° C. and caustic was added to phenolphthalein alkalinity and the product was filtered after digesting at 50° C. for a period of 1 hour. The filter cake was washed neutral and dried and the product, 4-nitro-2-stilbenecarbonitrile, had a high degree of purity as indicated by its melting point and the yield was excellent, being greater than 80 percent of theory.

EXAMPLE IV

*Preparation of 2'-Methyl-4-Nitro-2-Stilbenecarbonitrile*

A mixture of 81 grams of 5-nitro-o-tolunitrile (0.5 mol), 66.0 grams of o-tolualdehyde (0.55 mol) and 5 cc. of hexamethyleneimine was heated for a period of 2 hours with agitation to a temperature in the range of 123° C.–125° C. After an additional hour, 2.5 cc. of hexamethyleneimine was added. After another hour, another 2.5 cc. of hexamethyleneimine was added to the reaction mixture and heating continued at the above temperature for another hour whereupon the temperature of the reaction mixture was reduced to 105° C. and 150 cc. of glacial acetic acid was added to the reaction mixture. The mass was then cooled slowly with agitation, filtered and the filter cake washed with 100 cc. of glacial acetic acid. The filter cake was resludged in 900 cc. of water at a temperature of 50° C. and caustic was added to phenolphthalein alkalinity and the product was filtered after digesting at 50° C. for a period of 1 hour. The filter cake was washed neutral and dried and the product was obtained in a high yield and had excellent purity.

EXAMPLE V

*Preparation of 4'-Methoxy-2-Stilbenecarbonitrile*

A mixture of 81 grams of 5-nitro-o-tolunitrile (0.5 mol), 74.8 grams of p-anisaldehyde (0.55 mol) and 5 cc. of hexamethyleneimine was heated for a period of 2 hours with agitation to a temperature in the range of 123° C.–125° C. After an additional hour, 2.5 cc. of hexamethyleneimine was added. After another hour, another 2.5 cc. of hexamethyleneimine was added to the reaction mixture and heating continued at the above temperature for another hour whereupon the temperature of the reaction mixture was reduced to 105° C. and 150 cc. of glacial acetic acid was added to the reaction mixture. The mass was then cooled slowly with agitation, filtered and the filter cake washed with 100 cc. of glacial acetic acid. The filter cake was resludged in 900 cc. of water at a temperature of 50° C. and caustic was added to phenolphthalein alkalinity and the product was filtered after digesting at 50° C. for a period of 1 hour. The filter cake was washed neutral and dried and the product was obtained in high yield and of an excellent grade of purity.

Various modifications of the invention will occur to persons skilled in the art. Thus, it is evident that in lieu of using the compounds of the examples, any of the compounds mentioned above can be employed with similar results. Therefore, it is not intended that the invention be limited in the patent granted except as necessitated by the appended claims.

What is claimed is:

1. The process of preparing a 4-nitro-2-stilbene carbonitrile which comprises condensing at a temperature of from about 50° C.–150° C. a mono-cyclic aromatic aldehyde with 5-nitro-o-tolunitrile in the presence of from about 0.035 mole to 0.1 mole of hexamethyleneimine per mole of 5-nitro-o-tolunitrile.

2. The process according to claim 1 wherein the aromatic aldehyde is benzaldehyde.

3. The process according to claim 1 wherein the aromatic aldehyde is p-chlorobenzaldehyde.

4. The process according to claim 1 wherein the aromatic aldehyde is o-tolualdehyde.

5. The process according to claim 1 wherein the aromatic aldehyde is p-anisaldehyde.

References Cited in the file of this patent

UNITED STATES PATENTS 2,865,916    Leavitt et al. _____ Dec. 23, 1958